Figure 6:
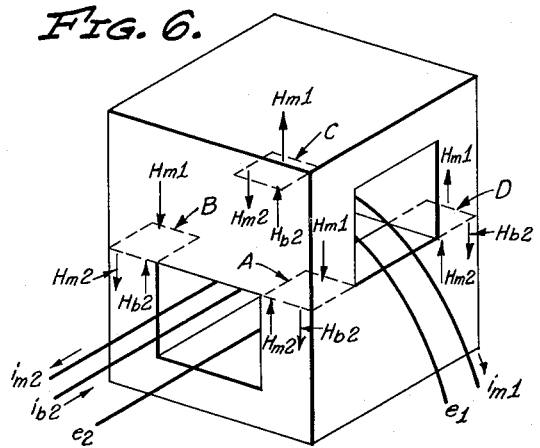

Oct. 23, 1962    E. L. WOODS    3,060,321
MAGNETIC DEVICE
Filed July 25, 1960    2 Sheets-Sheet 1
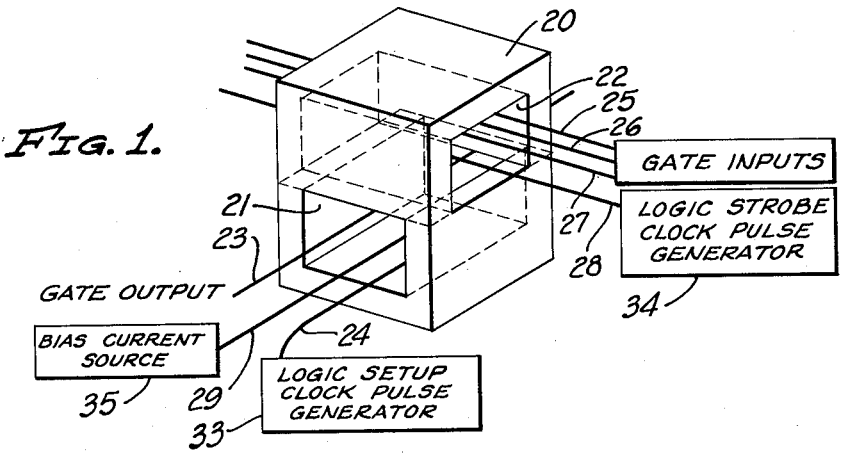
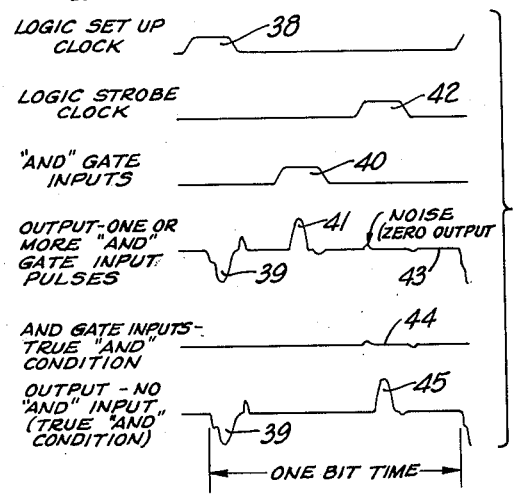
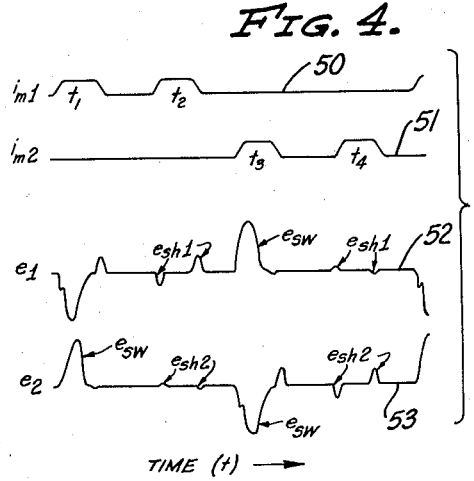
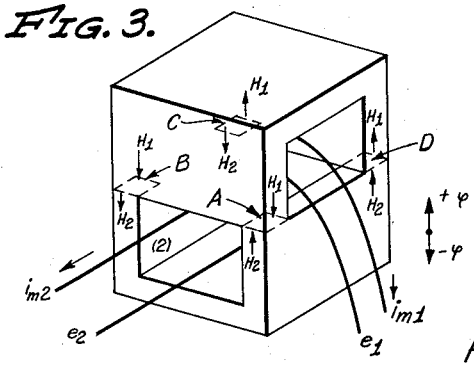
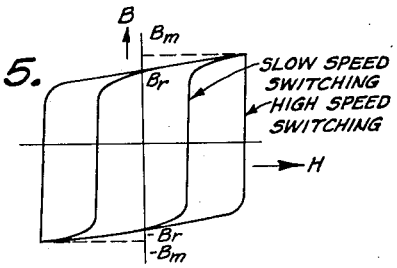
INVENTOR
ELVIN LEONARD WOODS
BY HIS ATTORNEYS
HARRIS, KIECH, RUSSELL & KERN Oct. 23, 1962  E. L. WOODS  3,060,321
MAGNETIC DEVICE
Filed July 25, 1960  2 Sheets-Sheet 2

INVENTOR
ELVIN LEONARD WOODS
BY HIS ATTORNEYS
HARRIS, KIECH, RUSSELL & KERN

United States Patent Office 3,060,321
Patented Oct. 23, 1962

3,060,321
MAGNETIC DEVICE
Elvin Leonard Woods, Tustin, Calif., assignor to Ford Motor Company, Dearborn, Mich., a corporation of Delaware
Filed July 25, 1960, Ser. No. 45,022
5 Claims. (Cl. 307—88)

This invention relates to magnetic elements, such as logical And and Or gates, memory devices and the like, and in particular, to magnetic elements of the magnetic flux switching type.

It is an object of the invention to provide a small, dependable magnetic element having a very high signal-to-noise ratio. A further object is to provide such an element in which the signal-to-noise ratio may be further improved by means of a bias. It is an object of the invention to provide a logic element having a signal and no signal output for the true and false states in contrast to the plus and minus signal output. A further object is to provide a logic element whereby a large number of the elements may be operated as And gates with the outputs thereof connected in series to provide an Or operation. Where large numbers of outputs are connected in series, the noise or no signal output of each element must be extremely small since they are cumulative in effect. It is an object of the invention to provide a logic element which requires a very small volume of magnetic material thereby permitting high speed operation, and one in which the hysteresis characteristic of the material is not critical. A further object is to provide such a device wherein the particular physical form is not critical thereby permitting optimum manufacturing techniques to be utilized.

It is an object of the invention to provide a magnetic element of the flux switching type which may be operated with various pulse sequences depending upon the particular characteristics which are of importance in a specific application. A further object is to provide such a device for logic applications which requires only a minimum of current from the gate or information inputs as the input currents do not have to supply the power for flux switching. A further object is to provide a magnetic logic element which eliminates the normally present reverse voltage component due to decay of drive currents, which component would appear as noise in the output.

It is an object of the invention to provide a magnetic flux switching element including a unitary block of magnetic material having first and second nonparallel openings therethrough, with substantially no magnetic material between the openings and with the openings disposed relative to each other to provide a separate flux path about each opening not coupling the other opening and an alternate flux path about both openings sharing common magnetic material with the separate paths, means for producing current pulses through each of the openings to produce a flux about the opening with substantially zero net flux about the other opening and to produce a flux about both openings with substantially equal flux about each opening, and means for detecting the flux changes about one opening due to the flux switching produced by the current pulses in the other opening.

It is an object of the invention to provide a magnetic element including a unitary block of magnetic material having first and second nonparallel axes disposed relative to each other such that a current along an axis produces a shuttle component of flux about such axis and substantially a zero shuttle component of flux about the other axis, first means for switching net flux from about the first axis to about the second axis, second means operable as a function of the operation to be performed for nullifying the first means and leaving a flux about the first axis, third means for establishing a flux about one of the axes following operation of the first and second means, and an output circuit for detecting flux change about the other of the axes produced by the third means.

It is another object of the invention to provide a magnetic logic element having a unitary block of magnetic material with first and second openings therethrough, with the openings disposed at right angles to each other and with substantially no magnetic material therebetween, means for producing gate input current pulses through the first opening, means for producing logic strobe current pulses through the first opening, means for producing logic setup current pulses through the second opening, and means for detecting flux changes about the second opening.

It is a further object of the invention to provide a magnetic flux switching element formed of a unitary block of square loop magnetic material having first and second openings therethrough, with the openings disposed at right angles and offset relative to each other with no magnetic material therebetween at the crossing.

The invention also comprises novel combinations and arrangements of components and novel modes of operation, which will more fully appear in the course of the following description. The drawings merely show and the description merely describes preferred embodiments of the present invention which are given by way of illustration or example.

Figure 7:
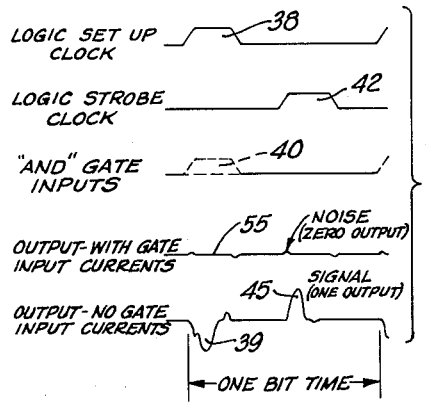
Figure 8:
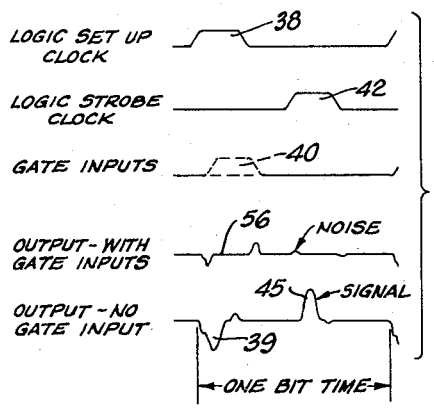
Figure 9:
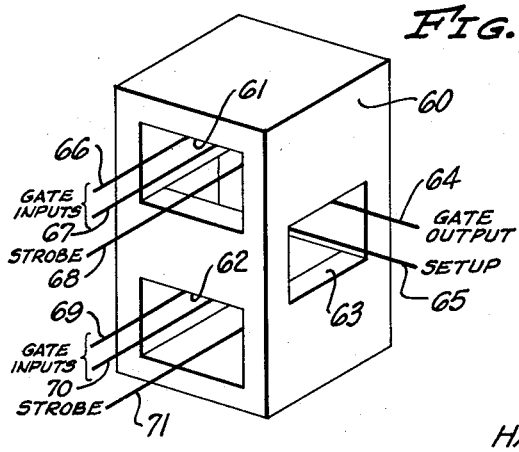

In the drawings:
FIG. 1 is a diagrammatic representation of a preferred form of the invention;
FIG. 2 is a graph illustrating the current and voltage relationships in the device of FIG. 1;
FIG. 3 is a diagram illustrating the magnetic relations in the device of the invention;
FIG. 4 is a graph of the current and voltage relations of the device of FIG. 3;
FIG. 5 is a hysteresis diagram of the device of FIG. 3;
FIG. 6 is a diagram similar to FIG. 3 but of an alternative form;
FIGS. 7 and 8 are graphs of current and voltage relations in alternative modes of operation of the device of FIG. 1; and
FIG. 9 illustrates an alternative physical form of the device of FIG. 1.

The magnetic element will be described herein in terms of a logical And gate; however, it should be noted that the element may also be used for other applications by suitably defining the states of the input and output signals. Referring to FIG. 1, the logic element includes a block 20 of magnetic material having openings 21, 22 therethrough. A gate output conductor 23, a logic setup conductor 24 and a bias current conductor 29 are positioned in the opening 21. Gate input conductors 25, 26, 27, and a logic strobe conductor 28 are positioned in the opening 22. Each conductor may be threaded through the corresponding opening one or more times as desired, with an increase in the number of turns resulting in a corresponding decrease in the current required to provide the desired ampere turns.

A logic setup clock pulse generator 33 is connected to the logic setup conductor 24. A logic strobe clock pulse generator 34 is connected to the logic strobe conductor 28. A bias current source 35 is connected to the bias conductor 29. It should be noted that the bias conductor is not essential to the operation of the device but is used in certain applications for purposes to be described below. The gate input conductors 25, 26, 27 are fed from flip-flops or other suitable circuits which provide the information to the "Anded" in the logic element. Similarly, the gate output conductor 23 is connected to an appropriate circuit for utilizing the logic information generated on the gate output conductor.

The shape of the block 20 is not critical and the openings are disposed relative to each other such that their axes are nonparallel. Then a current through an opening can produce a flux about such opening with substantially zero net flux about the other opening. This relation is best achieved by having the openings at right angles to each other. Also, it is preferred that there be no magnetic material between the openings at their crossing since such material decreases the signal output without decreasing the noise output, resulting in a decrease in signal-to-noise ratio. In the preferred form of FIG. 1, the openings intersect but are offset from each other so that there is no magnetic material between the openings but there is a maximum of open space at the intersection for passage of conductors. Any magnetic material exhibiting remanence will be suitable for use with the logic element but a high squareness ratio material is preferred. Pressed ferrite materials are presently being used in the relatively high speed switching applications. The offset opening structure of FIG. 1 is particularly adapted for pressing fabrication. The blocks presently being used are in the order of 0.050 by 0.050 by 0.080 inch.

The device of FIG. 1 operates in general as follows: Assuming that the block is initially demagnetized, a current in a conductor in the lower opening 21 will set up a flux around this opening, with negligible flux enclosing the conductors in the upper opening 22. If after this flux condition is established, a current pulse is again introduced in a conductor in the lower opening in the same direction as the earlier pulse, there will be negligible flux change and a negligible output on the conductor in the upper opening. However, a current in a conductor in the upper opening will set up a flux about the upper opening and leave negligible flux enclosing the conductors in the lower opening. This phenomenon is referred to as flux switching.

A three-pulse sequence for operation of the logic element of FIG. 1 is shown in FIG. 2. Initially, a current pulse 38 is generated in the logic setup conductor 24, establishing a saturated flux condition around the lower opening. A pulse 39 is produced on the gate output conductor 23. The next event in time is the And gate inputs. If any of the And gate input conductors has a current therein, such as the pulse 40, a saturating flux condition will build up around the upper opening. As this occurs, a flux change will also occur around the conductors of the lower opening, the flux condition changing from a saturating condition to a zero net flux. This flux change or flux switching produces a pulse 41 on the gate output conductor 23. Following the time for the gate input pulses, a current pulse 42 is produced on the logic strobe conductor 28 in the upper opening. It is during the time of this logic strobe pulse 42 that the condition of the output conductor 23 is determined and used in subsequent operations.

Two output conditions are possible. If any of the And gate inputs had a current pulse during the second phase of the three-pulse sequence, such as the pulse 40, flux will have been established around the upper opening with zero net flux about the lower opening and the following strobe pulse 42 will produce no flux switching and substantially zero output on the conductor 23, as indicated by the curve 43. The only output is a small amount of noise which will be discussed in detail hereinafter. This is the zero signal or false output for the And gate. If, as shown in curve 44, there were no And gate input current pulses following the logic setup pulse, the logic strobe pulse 42 will produce flux switching, establishing a flux around the upper opening and zero net flux about the lower opening and producing a pulse 45 on the output conductor 23. This corresponds to the signal or true state of the And gate. The logic element described above will logically determine an And condition and store the result until interrogated by the logic strobe pulse. This memory capability of the And gate is an important function since logical systems can be built utilizing the logic element of the invention without requiring additional storage devices.

The operation of the magnetic element will be described in conjunction with FIGS. 3, 4 and 5. A number of expressions used in the following description are defined as follows:

$i_m$—net magnetizing current
$i_{m1}$—net magnetizing current-opening 1 (upper)
$i_{m2}$—net magnetizing current-opening 2 (lower)
$e$—net induced voltage ($e = N d\phi/dt$)
$H$—magnetic intensity or magnetizing force
$N$—number of turns
$\phi$—magnetic flux
$B$—Flux density (magnetic induction) $= \phi/A$
$B_r$—residual flux density
$B_m$—maximum flux density
$A$—cross sectional area
$e_{sh}$—induced voltage (shuttle component) as a result of an $i_m$ in the same direction in any opening as the current which established the residual flux condition.
$e_{sw}$—inducted voltage (switching component) as a result of an $i_m$ in such a direction in any opening to induce a nonreversible change of magnetic induction.
$i_b$—net bias current
$B_r/B_m$—squareness ratio Consider the repeating four-pulse sequences of FIG. 4. The upper curve 50 corresponds to the net magnetization current flowing in a conductor in the upper opening. The second curve 51 represents the net magnetization current in a conductor in the lower opening. The curves 52, 53 represent the induced voltages corresponding to the rate of change of flux around each of the conductors in the upper and lower openings, respectively.

The significant features of these waveforms are as follows: Consider the induced voltage waveform for magnetizing current flowing in conductors of the same opening at time $t_1$. A net magnetization current flows in the upper opening inducing a voltage $e_1$ as indicated by the first portion of waveform 52. At time $t_2$ a second magnetization current flows in the upper opening producing only a shuttle component of induced voltage around the conductors in the upper opening. This is represented by the second portion of the waveform of $e_1$. If this were a conventional toroid, the first portion of the waveform represented by $e_1$ could correspond to the signal and the second portion of the voltage waveform corresponding to time $t_2$ would correspond to the noise. As presented by this figure, the typical signal-to-noise ratio would be approximately 3 to 1 based on peak voltage amplitudes. If the squareness ratio for the magnetic material were equal to One, the signal-to-noise ratio would be infinite due to the device. Conventional magnetic materials are not always good enough in regard to their squareness ratio properties and in particular, ferrites for high speed pulse work are even less square than many other metallic magnetic materials (used in slower speed work). Thus squareness becomes a limiting factor in the application of a device using a given material at a given speed.

Now consider the induced voltage waveforms for current pulses alternating in time between conductors threading the upper and lower openings. This results in induction changes around the conductors of both openings (this operation would correspond to only the first pulse represented by $i_{m1}$ and the first pulse represented by $i_{m2}$ repeating in time sequence). Under these conditions, the induced voltages of the $e_1$ and $e_2$ waveforms would be the voltages corresponding to the time duration represented by the current pulses at $t=t_1$ and $t=t_3$. There is a basic difference in the shapes of the induced voltage waveforms at a particular time which depends on whether the magnetization current is in the same opening as the conductors with the induced voltage or in the other opening. The basic difference between the voltage waveforms represents an effective improvement in the squareness ratio that is considerably greater than the actual magnetic characteristics of the material. (Theoretically, if the material had a squareness ratio of One, there would be no change in flux during the magnetizing current decay.)

Next consider the induced voltage waveforms due to consecutive magnetization currents in the other opening. The first current pulse in the lower opening occurs at $t_3$ time. This induced voltage $e_1$ (signal) has a slightly different shape than the induced voltage at $t_1$ time. A second magnetization current pulse in the lower opening at $t_4$ time results in induced voltage (noise) on the conductors in the upper opening, which is considerably smaller at this time than the induced voltage at $t_2$ time. The signal-to-noise ratio is much improved by inducing a flux change around the signal conductor in the upper opening by means of a magnetization current in the lower opening. Obviously, a similar situation occurs with respect to the induced voltage occurring around the conductors in the lower opening as represented by the waveform of $e_2$. In this case, the induced voltage represented at $t_1$ and $t_2$ time corresponds to the signal and noise, respectively. During this time interval, magnetization current producing these flux changes is in the opening which does not carry the output conductor.

Correlation of these waveforms to the hysteresis loop which represents the magnetic characteristics of a given material aid in the understanding of the operation of the device. Typical hysteresis loops of a given magnetic material as shown in FIG. 5. The narrower loop represents the low frequency B-H loop. The wider loop represents the B-H characteristic for a faster flux switching operation. As the hysteresis loop indicates, a higher energy per unit volume is required to traverse the hysteresis loop in a shorter interval of time. Very little change in residual flux density occurs although a very much higher magnetization current (corresponding to the magnetizing force) is required.

Consider the flux conditions that exist at $t_1$ time as a result of $i_{m1}$. (Due to a previous $i_{m2}$ pulse the magnetic induction has been established at a residual level in the four corners represented by A, B, C, and D of FIG. 3. The residual induction in corners A and D is upwards and in corners B and C it is downwards.) A magnetization current $i_{m1}$ tends to retain the residual induction in corners D and B and reverse the residual induction associated with A and C. The result of $i_{m1}$ at $t_1$ will be as follows: An induction change will occur during the interval of $i_{m1}$ in corners A and C corresponding to transversing the hysteresis loop from $+B_r$ to $-B_m$ for corner A and from $-B_r$ to $+B_m$ for corner C. The flux density in corner D changes from $+B_r$ to $+B_m$ during the rise time of $i_{m1}$. As $i_{m1}$ decays, the induction change in corner D will return from $+B_m$ to $+B_r$. The induction changes in corner B are similar except the flux density is in a downward direction corresponding to an induction change from $-B_r$ to $-B_m$ during the rise of $i_{m1}$ and from $-B_m$ to $-B_r$ during the decay of $i_{m1}$. The backswing of the induced voltage $e_1$ corresponding to the fall time of $i_{m1}$ at $t_1$ time represents this induction change from $B_m$ to $B_r$.

Consider the second magnetization current pulse represented by the waveforms of $i_{m1}$ at $t_2$ time. Since the flux in corners A and C has now been reversed due to the preceding $i_{m1}$ current pulse, the flux orientation now corresponds to the residual flux density being upward in corners C and D and downward in corners A and B. The effect of the second $i_{m1}$ pulse is to cause the flux density to shuttle in these four corners as follows: (Shuttle refers to induction changes between $B_r$ and $B_m$). Corners C and D correspond to an induction change from $+B_r$ to $+B_m$ corresponding to the rise time of the second $i_{m1}$ pulse. In a similar manner, corners A and B will shuttle between $-B_r$ and $-B_m$. The induced voltage around conductors in the upper opening must be equal to the rate of change of flux corresponding to the sum of the induction changes of corners C and D. This induced voltage is shown by the $e_1$ waveform corresponding to the second $i_{m1}$ pulse at $t_2$ time. Since the concept of flux involves continuous lines of closure, the magnitude of the sum of the induction changes in corners C and D must correspond to the magnitude of the sum of the induction changes in corners A and B.

The induced voltage of the conductors in the lower opening at $t=t_2$ corresponds to the sum of the induction changes taking place in corners A and D or the sum of the induction changes taking place in corners B and C. During the rise of the magnetization current $i_{m1}$ at $t_2$, the induction change is from $+B_r$ to $+B_m$ (upwards) in corner D and from $-B_r$ to $-B_m$ (downwards) in corner A. The net change in magnetic induction encompassing the lower opening represents the difference in magnitude of these two induction changes. When the device shape is reasonably good, the magnitude of the flux change corresponding to corner D approximately equals the magnitude of the flux change corresponding to corner A. Hence the induced voltage around the conductors in the lower opening is nearly zero even though a relatively large shuttle takes place in the four corners. This difference is represented by the relatively small output voltage around the conductors of the (waveform $e_2$) resulting from $i_{m1}$ in the upper opening.

The magnetization pulse $i_{m2}$ at $t_3$ time in the lower opening will reverse the residual flux in corners A and C and shuttle the residual flux in corners B and D. The induced voltage of the conductors associated with the lower opening will represent flux magnitude changes from $-B_r$ to $+B_m$ in corners A and C and then as the magnetization current decays, from $+B_m$ to $+B_r$. The normal shuttle component in corners B and D is part of this induced voltage. However, the induced voltage of the conductors threading through the upper opening will correspond to essentially a flux density change from one residual flux level to the other and appear as though the material had a squareless ratio much higher than it actually has. This is because the shuttle component in corner D is upward and in corner C is downward. The induced shuttle component for the conductors in the upper opening must be the difference (vector sum) of these two components. Since these components are nearly equal, the difference is nearly zero. Hence, this signal output lacks the characteristic backswing normally associated with the ferrite material of a given squareness ratio. The effect of the second magnetization pulse in the conductor in the lower opening at $t_4$ time results in almost zero net induction change around the upper opening. Corners A and D shuttle upward and corners B and C shuttle downward. The shuttle component of induction change corresponds to the change in induction from $B_r$ to $B_m$ and $B_m$ to $B_r$. The resultant difference of these induction changes in corners C and D or A and B represents the induced voltage around the conductors of the upper opening. Again, this difference is nearly zero.

In summary, it has been shown that it is possible to greatly improve the ratio of pulses corresponding to the signal and the noise by producing these induction changes by means of a net magnetization current in one opening while observing the induced voltage of the conductors in the other opening. Test results have indicated an order of magnitude improvement on the signal-to-noise ratio using this structure over that which would correspond to observing the signal on a conductor through the same opening in which that magnetization current flows.

The desired switching of net flux from about one opening to about the other opening, leaving a zero or substantially zero net flux about the one opening, is achieved by use of the block of square loop magnetic material with the two nonparallel openings therethrough. Orthogonal openings are preferred, being easy to fabricate and eliminating air coupling between the respective conductors, but skewed or oblique openings may be used, as such orientation also provides a flux path about each opening, respectively, with each path not necessarily coupled about the other opening.

The signal-to-noise ratio may be further improved by utilizing a bias current in the output opening 21. Consider the conditions shown in FIG. 6, which is similar to FIG. 3 with the bias conductor added.

The current in the bias conductor has a direction opposite to the $i_{m2}$ current. The magnetomotive force resulting only from this bias current is generally small enough to insure that very little flux can switch regardless of the flux condition. The characteristics of the device are such that the differences in the shuttle components of flux in the two corners on one side of the output conductor (noise output) are in the same direction as for the signal output with zero bias current. Hence, the phase of the noise output corresponds to the phase of the signal output. The bias current changes the effective magnetic induction of the four corners to an extent such that the apparent shuttle components in corners A and B or C and D will cancel. Here, "apparent" indicates that a portion of the flux can actually be a very small switching component which switches during the rise time of the current pulse and is, hence, very similar in wave shape and "appears" as a shuttle component change. The effect of the bias is a gradual one. As the bias is increased from zero, the noise component decreases in magnitude, goes through zero and eventually reverses phase. Hence, it is possible to reverse the phase of this noise component if desired.

Consider the induced voltage $e_2$ at $t_1$ time as the signal, and the induced voltage on the same conductor at $t_2$ as the noise. Corresponding to these conditions, a magnetization current $i_{m1}$ flows in the upper opening and a bias current $i_{b2}$ flows in a conductor in the lower opening. The result of $i_{m1}$ produces a magnetizing force $H_{m1}$ acting upwards in corners C and D and downward in corners A and B. These magnetizing forces correspond in direction to the residual flux conditions at $t_2$ time. The magnetizing force $H_{b2}$ is opposite to the direction of the magnetizing force of $i_{m1}$ acting on corners B and D and in the direction of the magnetizing force of $i_{m1}$ in corners A and C. Since the initial shuttle flux change in corner D was larger than corner A, the net change was upwards. The effect of the bias current is to reduce the different in the net shuttle components in leg D and leg A. Hence, by a proper level of bias current, the apparent shuttle component in legs A and D can be made equal. The induced voltage around the conductors in the lower opening will then be reduced to substantially zero corresponding to a very high signal-to-noise ratio, as represented by the ratio of the voltages around the conductors in the lower opening induced by the two consecutive $i_{m1}$ pulses occurring in the upper opening.

The logic element of FIG. 1 can be operated as an Or gate with a current pulse on a gate input conductor corresponding to an Or gate input and a zero or no signal condition on the output conductor corresponding to a true Or condition. Also, a plurality of the And gates of FIG. 1 can be connneected as an Or gate by threading a single output conductor through the upper opening of each And gate. The high signal-to-noise ratio of the element is particularly advantageous in its use as an Or gate since the no signal or noise output of each And gate is cumulative in the Or gate output. When only a few And gates or Ored together, the bias current is ordinarily not necessary. However, when a large number of And gates are Ored, such as twenty or more, the additional reduction in signal-to-noise ratio achieved by use of the bias current is often of value.

The device of FIG. 1 is shown with separate conductors for each of the currents. However, it should be noted that the device could be constructed with only a single conductor in place of the gate output and logic setup conductors and a single conductor in place of the gate input and logic strobe conductors with these conductors being shared on a time basis by the various input and output circuits. In most instances, it is far simpler to provide separate conductors for each function rather than to provide the switching necessary for sharing of the single conductors.

One alternative pulse sequence for operating the logic device is shown in FIG. 7. This is commonly referred to as the two-pulse sequence and is quite similar to the three-pulse sequence of FIG. 2. The gate input current pulses 40 are timed to occur with the logic setup current pulse 38. If no gate input current pulse occurs, the logic setup pulse 38 will switch the net flux to around the upper opening producing the pulse 39. The following strobe current pulse 42 will switch the flux to around the lower opening, creating the output signal pulse 45. However, if one or more And gate input pulses 40 occurs simultaneously with the logic setup pulse 38, the current in the lower opening will inhibit the action of the current in the upper opening so that the net flux remains around the lower opening, resulting in zero output on the output conductor, as indicated by the curve 55. Then the logic strobe pulse 42 will not produce any flux switching since the net flux is already around the lower opening and the signal on the output conductor will continue to be zero.

The two-pulse sequence does not require flux switching energy to be supplied by the gate inputs as all of the energy necessary for flux switching can be supplied by the setup and strobe pulses. Also, flux switching occurs only for true outputs resulting in a minimum of energy dissipation in the magnetic material. Of course, the two-pulse sequence permits a faster operating rate than the three-pulse sequence.

Another pulse sequence for operation of the device is shown in FIG. 8. This is quite similar to the other seqeunces and is referred to as the delayed two-pulse sequence. This sequence is of particular value in conjunction with very high speed logic systems where it is possible that the gate inputs will be slightly delayed relative to the logic setup pulses. With no gate input pulses, the operation is identical with that described in conjunction with the sequence of FIG. 7. When a gate input pulse 40 occurs slightly delayed from the setup pulse 38, some flux switching takes place, as indicated in the curve 56. The setup pulse 38 begins to switch the flux until it is inhibited by the delayed initiation of the gate input pulse 40. The gate input decay lags the logic setup decay and switches the flux back to around the lower opening. Then the following logic strobe pulse 42 produces no flux switching resulting in a zero output.

An alternative shape of the block of magnetic material is shown in FIG. 9. A block 60 has parallel openings 61, 62 and a transverse opening 63 passing between the parallel openings. A gate output conductor 64 and a logic setup conductor 65 are positioned in the opening 63. Gate input conductors 66, 67 and a logic strobe conductor 68 are positioned in the opening 61 and gate input conductors 69, 70 and a logic strobe conductor 71 are positioned in the opening 62. The operation of the element of FIG. 9 is the same as that of FIG. 1 with the requirement that the currents in the openings 61 and 62 be in the same direction. A single strobe conductor can be used in place of the conductors 68, 71 provided it is threaded through both openings in the same direction. The principal advantage of the structure of FIG. 9 over that of FIG. 1 is the provision of greater area for input conductors. However, the block 60 is more difficult to manufacture and ordinarily a two-opening block with an enlarged opening for the input conductors will be more economic when a large number of inputs are desired.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a magnetic logic element, the combination of: a unitary block of magnetic material having first and second openings therethrough, with said openings disposed at right angles to each other and with substantially no magnetic material between said openings; at least one gate input conductor positioned in said first opening; a logic strobe conductor positioned in said first opening; a logic setup conductor positioned in said second opening; an output conductor positioned in said second opening; circuit means for coupling the current pulse to said setup conductor for producing a flux about said second opening and substantially zero net flux about said first opening; circuit means for coupling a current pulse to said input conductor as a function of a logical operation to be performed for nullifying the setup pulse to leave a flux about said first opening; and circuit means for coupling a current pulse to said strobe conductor following the time for said input conductor pulse for producing a flux about said first opening and generating a voltage in said output conductor when flux is switched from about said second opening to about said first opening.

2. In a magnetic logic element, the combination of: a unitary block of magnetic material having first and second openings therethrough, with said openings disposed at right angles to each other and with substantially no magnetic material between said openings; at least one gate input conductor positioned in said first opening; a logic strobe conductor positioned in said first opening; a logic setup conductor positioned in said second opening; an output conductor positioned in said second opening; circuit means for coupling a current pulse to said setup conductor for producing a flux about said second opening and substantially zero net flux about said first opening; circuit means for coupling a current pulse to said input conductor as a function of a logical operation to be performed and following said setup conductor pulse for switching flux from about said second opening to about said first opening; and circuit means for coupling a current pulse to said strobe conductor following the time for said input conductor pulse for producing a flux about said first opening and generating a voltage in said output conductor when flux is switched from about said second opening to about said first opening.

3. In a magnetic logic element, the combination of: a unitary block of magnetic material having first and second openings therethrough, with said openings disposed at right angles to each other and with substantially no magnetic material between said openings; at least one gate input conductor positioned in said first opening; a logic strobe conductor positioned in said first opening; a logic setup conductor positioned in said second opening; an output conductor positioned in said second opening; circuit means for coupling a current pulse to said setup conductor for producing a flux about said second opening and substantially zero net flux about said first opening; circuit means for coupling a current pulse to said input conductor as a function of a logical operation to be performed and simultaneously with said setup conductor pulse for inhibiting flux switching; and circuit means for coupling a current pulse to said strobe conductor following said setup conductor pulse for producing a flux about said first opening and generating a voltage in said output conductor when flux is switched from about said second opening to about said first opening.

4. In a magnetic logic element, the combination of: a unitary block of magnetic material having first and second openings therethrough, with said openings disposed at right angles to each other and with substantially no magnetic material between said openings; at least one gate input conductor positioned in said first opening; a logic strobe conductor positioned in said first opening; a logic setup conductor positioned in said second opening; an output conductor positioned in said second opening; circuit means for coupling a current pulse to said setup conductor for producing a flux about said second opening and substantially zero net flux about said first opening; circuit means for coupling a current pulse to said input conductor as a function of a logical operation to be performed and starting during said setup current pulse for counteracting said setup current pulse to leave a flux about said first opening; and circuit means for coupling a current pulse to said strobe conductor following the time for said input conductor pulse for producing a flux about said first opening and generating a voltage in said output conductor when flux is switched from about said second opening to about said first opening.

5. In a magnetic logic element, the combination of: a unitary block of magnetic material having first and second nonparallel openings therethrough with first and second flux paths of substantially equal reluctance about said first and second openings respectively, with substantially no magnetic material between said openings and with said openings disposed relative to each other to provide third and fourth nonparallel flux paths in said block with each of said third and fourth flux paths looping both of said openings such that a current through an opening produces a flux about such opening and substantially zero net flux about the other opening; at least one conductor positioned in said first opening; at least one conductor positioned in said second opening; circuit means for coupling a setup current pulse to a second opening conductor for producing a flux in said second path about said second opening and substantially zero net flux in said first path about said first opening; circuit means for coupling an input current pulse to a first opening conductor as a function of a logical operation to be performed for nullifying the setup pulse to leave a flux about said first opening; and circuit means for coupling a strobe current pulse to a first opening conductor following the time for said input pulse for producing a flux about said first opening and generating a voltage in a second opening conductor when flux is switched from about said first opening to about said second opening.

References Cited in the file of this patent

UNITED STATES PATENTS

| | | |
|---|---|---|
| 2,905,834 | Arsenault et al. | Sept. 22, 1959 |
| 2,982,947 | Kilburn et al. | May 2, 1961 |
| 2,985,768 | Bobeck | May 23, 1961 |
| 2,990,521 | Tominaga | June 27, 1961 |
| 2,994,067 | Rajchman | July 25, 1961 |

UNITED STATES PATENT OFFICE
CERTIFICATE OF CORRECTION

Patent No. 3,060,321

October 23, 1962

Elvin Leonard Woods

It is hereby certified that error appears in the above numbered patent requiring correction and that the said Letters Patent should read as corrected below.

Column 2, line 71, for "the "Anded" in" read -- be Anded in --; column 4, line 24, for "inducted" read -- Induced --; column 5, line 32, for "as" read -- are --; column 6, line 43, for "squareless" read -- squareness --.

Signed and sealed this 23rd day of April 1963.

(SEAL)
Attest:

ERNEST W. SWIDER
Attesting Officer

DAVID L. LADD
Commissioner of Patents